Patented Jan. 19, 1926.

1,570,062

UNITED STATES PATENT OFFICE.

HARRY J. HOFFMAN, OF STAMFORD, CONNECTICUT, ASSIGNOR TO E. I. DU PONT DE NEMOURS & COMPANY, OF WILMINGTON, DELAWARE, A CORPORATION OF DELAWARE.

PROCESS OF MAKING NONSTATIC FILM.

No Drawing. Application filed October 12, 1921, Serial No. 507,363. Renewed June 22, 1925.

*To all whom it may concern:*

Be it known that I, HARRY J. HOFFMAN, a citizen of the United States, and a resident of Stamford, in the county of Fairfield and State of Connecticut, have invented a certain new and useful Process of Making Nonstatic Film, of which the following is a specification.

This invention is in the art of making photographic film, and finds more particular application in the making of cinematographic film. More especially it relates to the making of so-called "non-static" film in which the tendency to static discharges of electricity, when the film is run through the camera, or through the projecting machine as the case may be, and in certain other circumstances, is mitigated or overcome by the addition of electrolytes to the film.

Heretofore it has been proposed to mix the electrolyte directly with the film "dope" (e. g., viscous cellulose ester solution which is cast into film) when making the film, and satisfactory film can be produced in this way. Certain considerations, however, make highly desirable a procedure whereby the electrolyte, while permanently related to the film, shall not be mixed through the body of the film, as is, of course, the case when the electrolyte is added to the "dope". The electrolyte has a corrosive or roughening action on metallic surfaces upon which it is frequently desired to cast the film, rather than on glass or porcelain. The electrolyte, being all through the film, comes into contact with the emulsion, and may injure that. Also the amount of electrolyte that it is advisable to use in the film is quite limited as the electrolyte, when used in excessive quantities, may harmfully effect the "dope".

The process of the present invention provides for the making of non-static film with the electrolyte for practical purposes permanently related to the film, and yet without the various, and other, disadvantages of the electrolyte-in-dope film noted above. With the electrolyte so related to the film, the electrolyte is not appreciably washed out of the film during developing, thereby to injure the developing solutions and so on; and, furthermore, the electrolyte is retained in the (negative) film to give non-static properties when the film is run through printing machine and is present and retained in the (positive) film to give non-static properties when it is run through the printing machine and the projecting machine. It is an object of the invention to provide such a process and is also an object to improve generally on processes of the general character indicated. To these ends my invention consists in the various matters hereinafter described and claimed.

The present process, briefly stated, consists in applying to the film a composition, e. g., a solution, containing the electrolyte, this solution comprising, together with the electrolyte, a substance or substances which will, to a slight extent, dissolve the material, for example cellulose ester, of the film; after the application the film is dried to remove the solvents. The practical effect of this is, that the electrolyte is for practical purposes permanently attached to the film and yet, rather than being distributed throughout the film, it is at, or closely adjacent to, the surface (where it is most effective). Thus, when, as is desirable, the electrolyte is applied to the back of the film, i. e., the side not carrying the emulsion, the electrolyte is not in immediate, and harmful, relation to the emulsion. Again, for a given amount of electrolyte at and closely adjacent the surface, the difficulty of having a material amount of electrolyte distributed through the film is eliminated, permitting the use of relatively large quantities of electrolyte at the surface. Also, with the electrolyte not coming into contact with the casting surface, difficulties which may arise from such contact, are eliminated.

The solution may be applied to the film during the casting or at any time after the casting, as during the drying or seasoning. The presence of some solvent in the film aids in the penetration of the film by the solvent of the electrolyte solution and, hence, in the electrolyte-attaching action. The solution may be applied in any suitable manner. Preferably it is applied by the "beading" method, that is, by running the film substantially in contact with the upper portion of a horizontally arranged roller which dips at is lower portion into a bath of solution, the roller in its rotation carrying the solution to, and depositing it on, the film. After the solution has been applied, the film is dried, as during the usual drying operation, to remove liquid and leave the electrolyte deposited, firmly attached to, and for practical purposes permanently related to, the film, but yet at, or close to, the surface thereof, as distinguished from distributed therethrough.

The amount of the electrolyte to be deposited will of course, vary with the efficacy of the particular electrolyte used, the degree of non-static effect it is desired to obtain, and similar factors. Generally speaking, an amount of electrolyte substantially equal to from 0.05 to 2.0% of the weight of the film, i. e., the emulsion support, and, for a generally usable specific amount 0.25%, should be sufficient, such amount of course being distributed substantially uniformly over the entire film surface to which application is made. The amount of electrolyte fixed in application will of course vary with the strength of the particular solution used, the activity of the solvent, the amount of solution applied, and with the "greenness" of the film, that is the amount of solvent in the film. The greater the activity of the solvent in the electrolyte solution and the greater the amount of solvent present in the film when the electrolyte solution is applied, the greater the amount of electrolyte fixed in an application, as will be understood. But even with a film containing but little residual solvent, say 4%, and with relatively weak solvent and the minimum amount of electrolyte (.1 to 99.9) mentioned below, the amount of electrolyte fixed in an application will be of appreciable non-static effect. It is desirable to use as little active solvent in the electrolyte solution as conveniently possible without sacrificing proper fixing of the electrolyte necessary for the non-static effect, and to not use a more active solvent than necessary. If desired, of course, a plurality of applications of the electrolyte may be used.

The particular solution, electrolytes and solvents, can, as will be understood by those skilled in the art of cellulose ester films, and of non-static films in particular, be greatly varied, the selection being great; but as a specific aid to the practicing of my invention, and without restricting my invention thereto, I give the following:—

For application to either a cellulose acetate or a cellulose nitrate film the solution may be (parts by weight and to give 100 parts in the sum)—

|  | Preferred | Range |
| --- | --- | --- |
| Electrolyte | 2.00 | 0.1 to 5.0 |
| Denatured alcohol (2—B) | 33.00 | 10.0 to 50.0 |
| Wood alcohol (commercial 99%) | 33.00 | 25.0 to 45.0 |
| Acetone (commercial c. p.) | 32.00 | 25.0 to 45.0 |

The electrolyte should, of course, be one soluble in the solvent mixture, and a non-precipitant of the pellicle former, e. g., the cellulose ester, of the film. The solvent should of course be miscible with the solvent in the film, and desirably and as above indicated, similar in character thereto. (The solvent mixture in the film may be, for cellulose nitrate, camphor, wood alcohol, acetone, fusel oil and amyl acetate; and, for cellulose acetate acetone, wood alcohol and triacetin, in suitable proportions.)

The electrolyte may be, for example, sodium acetate, ammonium acetate, potassium iodide, ammonium nitrate (preferable), ammonium iodide, ammonium sulphocyanate, cadmium iodide, calcium nitrate or nickel nitrate. As mentioned above, the amount of electrolyte desirable to be fixed for a given static effect will vary with the particular electrolyte in question; generally speaking from .05 to 2.0% of the weight of the film. With ammonium nitrate, for example, but .05% may be sufficient for certain non-static effects, while with certain of the others greater amounts may be desirable for similar effects. Should a film be destined for excessive washing and it be wished to guard against any possible losses of electrolyte and doubly ensure that the required amount of electrolyte be present in the washed film, an amount of electrolyte in excess of that normally required, and substantially equal to the anticipated loss, may of course be added to the film when treating the same with the electrolyte solution.

It is to be noted that the non-static-substance composition, e. g., the electrolyte solution, is non-pellicular in character, for example it contains no cellulose ester. As indicated above, the primary purpose of the present procedure is to substantially superficially add a non-static substance to the film by attachment of the substance thereto, thus avoiding the various difficulties with electrolyte-in-dope film; and it is not the primary purpose to build up a film one of whose strength-giving layers is made up of a pellicle former, e. g., a cellulose ester, and formed by the evaporation of solvent from a solution of pellicle former incidentally containing electrolyte. Therefore in the accompanying claims, references to "non-static-substance solution", "electrolyte solution", or the like, are to be understood as references to solutions which are primarily solutions of the substance or electrolyte rather than primarily pellicular solutions which contain the substance or electrolyte as an incident.

As will be understood the film is, for use, provided with any suitable sensitized emulsion, the electrolyte being preferably applied to the back of the film, or surface not carrying the emulsion. If desired for any reason the electrolyte may however be applied to the emulsion-carrying side of the film, of course being applied previous to the application of the emulsion. So that, a film in accordance with my invention may have electrolyte applied to either or both sides thereof. While addition of the electrolyte prior to the finishing of the film, i. e., the completion of the removal of all that amount of solvent which it is desired to remove from the film, has been more particularly referred to above, finished film may if desired be treated in accordance with the present process, and the solvent of the electrolyte solution dried out in any desired manner, allowing such time as desirable for proper penetration of the film and fixing of the electrolyte.

I claim:

1. The process of making non-static photographic film which comprises applying to the film a conductivity-increasing-substance composition, as distinguished from mixing such substance in the film dope, such composition comprising a conductivity-increasing-substance in a solvent for the film, and drying.

2. The process of making non-static photographic film which comprises applying to the film a conductivity-increasing-substance non-pellicular composition comprising a conductivity-increasing-substance in a solvent for the film.

3. The process of making non-static photographic cellulose ester film which comprises applying to the film a conductivity-increasing-substance non-pellicular composition, as distinguished from mixing such substance in the film dope, such composition comprising a conductivity-increasing-substance in cellulose ester solvent, and drying.

4. The process of making non-static photographic cellulose ester film which comprises applying to the film an electrolyte solution comprising an electrolyte dissolved in cellulose ester solvent, and drying.

5. The process of making non-static photographic cellulose ester film which comprises applying to the film a non-pellicular electrolyte solution comprising an electrolyte dissolved in cellulose easter solvent, and drying.

6. The process of making non-static photographic cellulose ester film which comprises applying to the film an electrolyte solution comprising substantially 0.1 to 5 parts of electrolyte per 99.9 to 95 parts of cellulose ester solvent, and drying.

7. The process of making non-static photographic cellulose ester film which comprises applying to the film an electrolyte solution comprising substantially 2 parts of electrolyte to 98 parts of cellulose ester solvent, and drying.

8. The process of making electrolyte-bearing non-static cellulose ester photographic film which comprises applying to the film, in quantity to fix on the film an amount of electrolyte substantially equal to .05 to 2% of the weight of the film, an electrolyte solution comprising such electrolyte dissolved in cellulose ester solvent, and drying.

9. The process of making electrolyte-bearing non-static cellulose ester photographic film which comprises applying to the film, in quantity to fix on the film an amount of electrolyte substantially equal to .25% of the weight of the film, an electrolyte solution comprising such electrolyte dissolved in cellulose ester solvent, and drying.

10. The process of making electrolyte-bearing non-static cellulose ester photographic film which comprises applying to the film, in quantity to fix on the film an amount of electrolyte substantially equal to .25% of the weight of the film, an electrolyte solution comprising such electrolyte dissolved in cellulose ester solvent in the proportions of substantially 2 parts of electrolyte to 98 parts of solvent, and drying.

11. The process of making ammonium nitrate-bearing non-static cellulose ester photographic film which comprises applying to the film, in quantity to fix on the film an amount of ammonium nitrate substantially equal to .25% of the weight of the film, an ammonium nitrate solution comprising ammonium nitrate dissolved in cellulose ester solvent in the proportions of substantially 2 parts of electrolyte to 98 parts of solvent, and drying.

In testimony whereof I affix my signature.

HARRY J. HOFFMAN.